Patented Aug. 16, 1932

1,872,333

UNITED STATES PATENT OFFICE

JOSEPH OTIS PEIRCE AND WARREN T. REDDISH, OF CINCINNATI, OHIO, ASSIGNORS TO THE KONTOL COMPANY, OF DALLAS, TEXAS, A CORPORATION OF TEXAS

EMULSION BREAKING

No Drawing.   Application filed April 29, 1927. Serial No. 187,700.

This invention relates to a process of decomposing the oil and water emulsions which are incidental to the production of petroleum and in the oil fields constitute nuisances. This invention also relates to a chemical reagent to be introduced into the emulsion to cause separation of the oil and water, so that the former is available for commercial use.

The object of this invention is to provide the process and reagent specified in the above paragraph and more particularly to provide reagents peculiarly effective in the treatment of emulsions, the water component of which is characterized by a low salt content.

The problem of providing an emulsion breaking reagent is twofold. First, the reagent must cause the components of the emulsion to tend to separate. Second, the reagent must be susceptible to facile dispersion throughout the emulsion in order to render the breaking operation commercially profitable.

According to this invention ethyl sulphuric acid is introduced into the emulsion. Heating to substantially 150° F. is recommended. After several hours, depending on the stability of the emulsion, the components are separated by stratification, centrifugal force, filtration or other means.

Approximately one part ethyl sulphuric acid to several parts emulsion is a proportion which yields satisfactory results in most cases. The percentage must be varied to suit the peculiarities of the emulsion to be treated.

This ethyl sulphuric acid is made by mixing alcohol of about 87% strength with sulphuric acid of about 78% strength until the acidity in terms of sulphuric acid is between one and five percent, preferably between 2.2% and 2.6%. This means about one part sulphuric acid to about 19 parts alcohol.

It is commercially expedient to use this ethyl sulphuric acid in conjunction with other emulsion breaking reagents, such as soap making materials, modified fatty acids, sulphonated fatty substances, etc. But it has been found particularly advantageous to use ethyl sulphuric acid in conjunction with the sulphonic bodies contained in the sludges resulting from the refining of mineral oil or its fractions. This is especially true of the mineral oil sludge sulphonates resulting from the fuming sulphuric acid treatment of an oil fraction, such as a lubricating stock. For a more detailed description of these bodies attention is directed to United States Letters Patents Nos. 1,301,662, 1,301,663 and 1,303,779 to Robert E. Divine.

All of the sludge sulphonic bodies can be used for emulsion breaking purposes either in their native sludge or they can be extracted. In the former case alcohol is added to the unneutralized acid sludge to provide an ethyl sulphuric acid approaching the preferred strength specified above. The sludge is then added to the emulsion and the process carried out as above indicated. If the sludge is a by-product of a fuming acid treatment about one part sludge to one thousand parts emulsion is normally adequate. More dilute sludges require greater percentages but the exact proportion is always controlled by the stability of the emulsion in the presence of the reagent.

Very effective reagents are made by mixing the Divine sodium sulphonates, often called green acid sulphonates, with ethyl sulphuric acid. Preferably pitch is also employed, a suitable pitch being one which has a melting point between 35° C. and 95° C. as tested by the ball and ring method of The American Society for testing materials specifications.

A preferred range of percentages is as follows:

| | Per cent |
|---|---|
| Water | 5–10 |
| Dry sodium hydroxide | 3– 4 |
| Mineral oil sulphonic acid from the sludge layer | 70–80 |
| Pitch | 5 |
| Ethyl sulphuric acid | 4– 5 |

The ingredients are mixed in the order named.

The mineral oil sulphonates and the ethyl sulphuric acid from a body of relatively low viscosity is easily handled and readily disperses throughout the emulsion. The presence of the ethyl sulphuric acid renders said sulphonates far more effective than they would be otherwise, particularly when used on relatively fresh water emulsions. The reagent is oil soluble and acid in reaction.

However, ethyl sulphuric acid has little corrosive effect on iron or steel pipes or containers and consequently this process not only provides good results but does not impose the limitations on the equipment used which characterizes many treatments of emulsions and the general handling of acid sludges. While the disclosure has been made in regard to ethyl sulphuric acid and ethyl alcohol, other alcohols can be used, methyl, for instance, being substantially equivalent to the ethyl.

Having described our invention, we claim:

1. The process of decomposing petroleum and water emulsion comprising adding ethyl sulphuric acid thereto.

2. The process of decomposing a petroleum and water emulsion comprising adding ethyl sulphuric acid and sodium sulphonate thereto.

3. The process of decomposing a petroleum and water emulsion comprising adding ethyl sulphuric acid, sodium sulphonate and pitch thereto.

4. The process of decomposing a petroleum and water emulsion comprising adding ethyl sulphuric acid thereto, heating said emulsion to substantially 150° F. and separating the oil and water.

5. The process of decomposing a petroleum and water emulsion comprising adding ethyl sulphuric acid and sodium sulphonate thereto, heating said emulsion to substantially 150° F. and separating the oil and water.

6. The process of decomposing a petroleum and water emulsion comprising adding ethyl sulphuric acid, sodium sulphonate and pitch thereto, heating said emulsion to substantially 150° F. and separating the oil and water.

7. A reagent for decomposing emulsions of petroleum and water, said reagent comprising water soluble mineral oil sulphonates and ethyl sulphuric acid.

8. A reagent for decomposing emulsions of petroleum and water, said reagent comprising mineral oil sulphonates, ethyl sulphuric acid and pitch.

9. A reagent for decomposing emulsions of petroleum and water, said reagent comprising the acid sludge resulting from sulphuric acid refining of petroleum fractions and alcohol in quantity sufficient to reduce the acidity to between one and five percent expressed in terms of sulphuric acid.

10. The process of breaking an emulsion of petroleum and water, said process comprising treating the same with an oil soluble acid emulsion breaking reagent comprising mineral oil sulphonates which are water soluble by themselves and ethyl sulphuric acid.

In witness whereof, we hereunto subscribe our names.

JOSEPH OTIS PEIRCE.
WARREN T. REDDISH.